United States Patent Office.

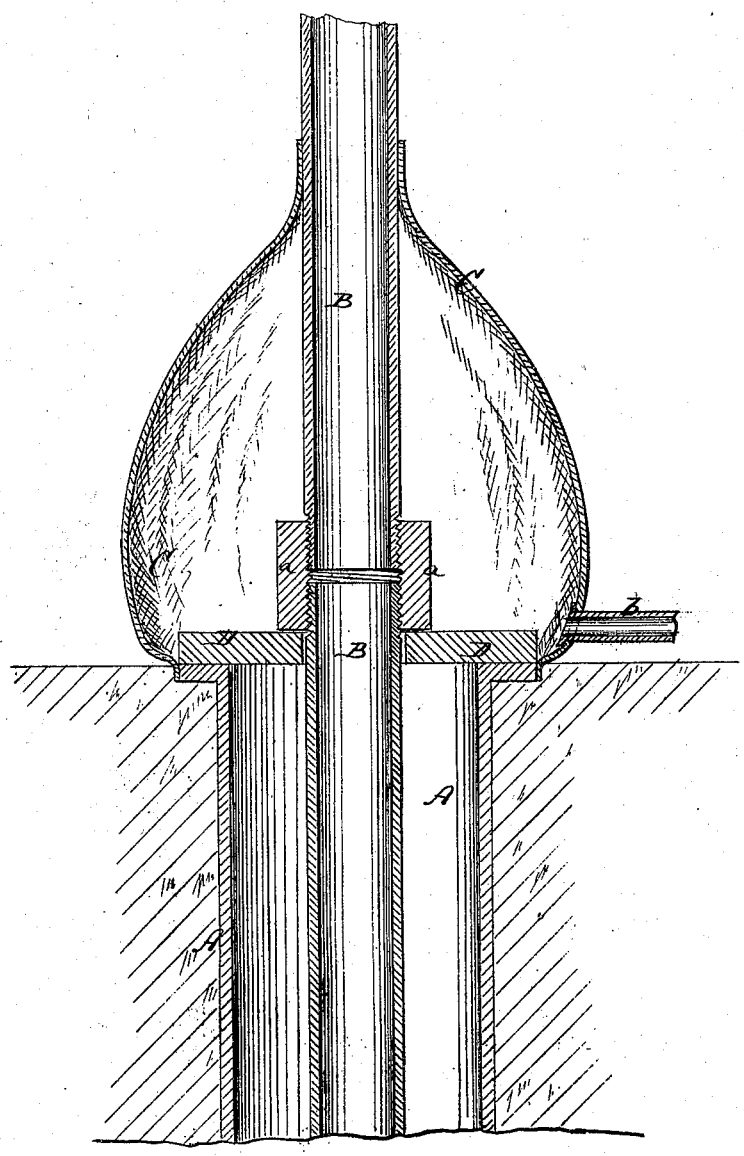

WILLIAM W. DEWEY, OF TIDIOUTE, PENNSYLVANIA.

Letters Patent No. 113,638, dated April 11, 1871.

IMPROVEMENT IN ATTACHMENTS TO OIL-WELL TUBING.

The Schedule referred to in these Letters Patent and making part of the same.

*To all whom it may concern:*

Be it known that I, WILLIAM W. DEWEY, of Tidioute, in the county of Warren and State of Pennsylvania, have invented a new and improved Attachment to Oil-Well Tubing; and I do hereby declare that the following is a full, clear, and exact description thereof which will enable others skilled in the art to make and use the same, reference being had to the accompanying drawing forming part of this specification, in which the drawing represents a vertical section of my attachment applied to oil-well tubing.

This invention has for its object to provide means for gathering the oil from well-tubes when they are being withdrawn from the wells. The tubes are generally filled with oil, and when the sections are taken apart above the wells the oil contained in the upper sections flows out and is wasted. To prevent this I have provided an elastic sack, which can be placed around the casing of the well to receive the oil that flows from the lower ends of the detached sections.

A in the drawing represents the upper part of the well-casing.

B is the tubing, made in sections, which are united by nuts $a$, in the ordinary manner.

C is a rubber sack, open at both ends. It is with its lower end fitted around the upper end of the case whenever the tubing is to be removed, so as to surround the devices D which are employed for raising the tubes.

Whenever the joint of two sections of tubing arrives above the top of the well the upper end of the bag is by hand closed against the tubing, as shown in the drawing, and the upper section is unscrewed.

The oil flowing from the lower end of such upper section will enter the sack and either be returned to the well or carried through a pipe, $b'$, which projects from the sack to a suitable receptacle. None of the oil is thus wasted and lost.

Having thus described my invention,

I claim as new and desire to secure by Letters Patent—

The sack C, open at both ends, and provided with the pipe $b$, substantially as specified, to be used for gathering oil from detached sections of oil-well tubing, in the manner set forth.

WILLIAM W. DEWEY.

Witnesses:
    JAMES E. HILL,
    RICHARD MAGILL.